United States Patent
Tizhoosh

(10) Patent No.: US 10,628,736 B2
(45) Date of Patent: Apr. 21, 2020

(54) SYSTEMS AND METHODS FOR BARCODE ANNOTATIONS FOR DIGITAL IMAGES

(71) Applicant: Huron Technologies International Inc., St. Jacobs (CA)

(72) Inventor: Hamid Reza Tizhoosh, Waterloo (CA)

(73) Assignee: HURON TECHNOLOGIES INTERNATIONAL INC., St. Jacobs (CA)

(*) Notice: Subject to any disclaimer, the term of this patent is extended or adjusted under 35 U.S.C. 154(b) by 108 days.

(21) Appl. No.: 15/274,351

(22) Filed: Sep. 23, 2016

(65) Prior Publication Data

US 2017/0091281 A1    Mar. 30, 2017

Related U.S. Application Data

(60) Provisional application No. 62/284,240, filed on Sep. 24, 2015.

(51) Int. Cl.
*G06F 7/00* (2006.01)
*G06N 3/08* (2006.01)
(Continued)

(52) U.S. Cl.
CPC ............... *G06N 3/08* (2013.01); *G06F 16/51* (2019.01); *G06F 16/583* (2019.01); *G06K 7/1439* (2013.01); *G06K 19/06028* (2013.01)

(58) Field of Classification Search
CPC .......... G06N 3/08; G06N 3/04; G06K 7/1439; G06K 19/06028; G06F 17/30247; G06F 17/3028
(Continued)

(56) References Cited

U.S. PATENT DOCUMENTS 4,991,092 A * 2/1991 Greensite ............... G06T 5/009
382/131
5,136,660 A * 8/1992 Flickner ............... G06T 11/006
382/131
(Continued)

FOREIGN PATENT DOCUMENTS

WO    2008089129 A1    7/2008

OTHER PUBLICATIONS

"A robust image fingerprinting system using the Radon transform"; Jin S. Seoa, Jaap Haitsma, Ton Kalker, Chang D. Yoo; Department of EECS, KAIST, 373-1 Guseong Dong, Yuseong Gu, Daejeon 305-701, South Korea Philips Research Eindhoven, Prof. Holstlaan 4, Eindhoven 5656AA, The Netherlands; May 6, 2003.*
(Continued)

*Primary Examiner* — Mohammed R Uddin
(74) *Attorney, Agent, or Firm* — Bereskin & Parr LLP/S.E.N.C.R.L., s.r.l.

(57) ABSTRACT

A content-based image retrieval (CBIR) system and method is presented herein. The CBIR system generates a relatively short vector or array of data, referred to as a barcode, from an input image. The short vector or array data can be used to represent the content of the image for image retrieval purposes. The system obtains the image and applies a transform to the image to generate a plurality of image transform values. The system thresholds the plurality of image transform values to obtain compact image transform values. The system generates a barcode in accordance with the compact image transform values and representative of the image. The system may then transmit the barcode to a database for storage or draw the barcode on a display. The system may also compare barcodes to find and retrieve similar images associated with similar barcodes.

20 Claims, 13 Drawing Sheets

(51) Int. Cl.
  *G06F 16/51* (2019.01)
  *G06K 7/14* (2006.01)
  *G06F 16/583* (2019.01)
  *G06K 19/06* (2006.01)
(58) Field of Classification Search
  USPC .................................. 707/693, 754, 755
  See application file for complete search history.

(56) References Cited

U.S. PATENT DOCUMENTS

| | | | | |
|---|---|---|---|---|
| 5,270,926 | A * | 12/1993 | Tam | G06T 11/005 |
| | | | | 378/4 |
| 5,288,977 | A | 2/1994 | Amendolia et al. | |
| 5,592,374 | A | 1/1997 | Fellegara et al. | |
| 6,424,737 | B1 * | 7/2002 | Rising, III | G06T 9/002 |
| | | | | 375/E7.04 |
| 7,239,750 | B2 | 7/2007 | Rising | |
| 8,086,587 | B2 * | 12/2011 | Obana | G06F 17/30781 |
| | | | | 707/705 |
| 8,494,268 | B2 | 7/2013 | Soederberg et al. | |
| 8,872,814 | B1 * | 10/2014 | Agaian | G06T 15/00 |
| | | | | 345/419 |
| 8,879,120 | B2 * | 11/2014 | Thrasher | H04N 1/387 |
| | | | | 358/1.9 |
| 9,081,822 | B2 | 7/2015 | Xu et al. | |
| 9,316,743 | B2 * | 4/2016 | Rousso | G01T 1/1603 |
| 9,535,928 | B2 | 1/2017 | Xu et al. | |
| 9,710,695 | B2 | 7/2017 | Xu et al. | |
| 2004/0133927 | A1 * | 7/2004 | Sternberg | G06F 17/30247 |
| | | | | 725/136 |
| 2004/0240737 | A1 * | 12/2004 | Lim | G06K 9/325 |
| | | | | 382/182 |
| 2006/0204042 | A1 * | 9/2006 | Hammoud | A61B 5/1103 |
| | | | | 382/107 |
| 2006/0257010 | A1 * | 11/2006 | George | G06T 11/006 |
| | | | | 382/131 |
| 2007/0181691 | A1 | 8/2007 | Chang | |
| 2008/0260200 | A1 * | 10/2008 | Suzaki | H04N 1/32144 |
| | | | | 382/100 |
| 2010/0008589 | A1 * | 1/2010 | Bober | G06K 9/4633 |
| | | | | 382/218 |
| 2010/0014780 | A1 * | 1/2010 | Kalayeh | G06T 1/00 |
| | | | | 382/284 |
| 2010/0187311 | A1 * | 7/2010 | van der Merwe | G06K 9/183 |
| | | | | 235/462.01 |
| 2012/0043377 | A1 | 2/2012 | Haar et al. | |
| 2013/0048731 | A1 * | 2/2013 | Flickner | G06K 7/146 |
| | | | | 235/462.12 |
| 2013/0098983 | A1 | 4/2013 | Neff | |
| 2014/0142979 | A1 | 5/2014 | Mitsunaga | |
| 2014/0263674 | A1 | 9/2014 | Cerveny | |
| 2014/0307934 | A1 * | 10/2014 | Batenburg | G06T 11/005 |
| | | | | 382/131 |

OTHER PUBLICATIONS

Chen et al., "Invariant Description and Retrieval of Planar Shapes Using Radon Composite Features", IEEE Transactions on Signal Processing, Oct. 2008, vol. 56 (10), pp. 4762-4771.
Daras et al., "Efficient 3-D Model Search and Retrieval Using Generalized 3-D Radon Transforms", Multimedia, IEEE Transactions on, Feb. 2006, vol. 8 (1), pp. 101-114.
Daugman, "How iris recognition works", IEEE Transactions on Circuits and Systems for Video Technology, Jan., 2004, vol. 14 (1), pp. 21-30.
Leutenegger et al., "Brisk: Binary Robust Invariant Scalable Key Points", in Proceedings of the 2011 IEEE International Conference on Computer Vision, Nov. 6-13, 2011, pp. 2548-2555.
Muja et al., "Fast Matching of Binary Features," in Proceedings of the 2012 Ninth Conference on Computer and Robot Vision, May 28-30, 2012, CRV '12, pp. 404-410.
Nacereddine et al., "Shape-Based Image Retrieval Using a New Descriptor Based on the Radon and Wavelet Transforms", in International Conference on Pattern Recognition, Aug. 23-26, 2010, pp. 1997-2000.
Ojala et al., "MultiResolution Gray-Scale and Rotation Invariant Texture Classification with Local Binary Patterns," IEEE Transactions on Pattern Analysis & Machine Intelligence, Aug. 7, 2002, vol. 24 (7), pp. 971-987.
Tabbone et al., "Histogram of Radon Transform. A Useful Descriptor for Shape Retrieval", in Pattern Recognition, 2008, ICPR 2008. 19th International Conference on Dec. 2008, pp. 1-4.
Tizhoosh, "Barcode Annotations for Medical Image Retrieval: A preliminary investigation", in IEEE International Conference on Image Processing, Sep. 2015, pp. 818-822.
T.V. Hoang and S. Tabbone, "Invariant pattern recognition using the RFM descriptor," Pattern Recognition, vol. 45, pp. 271-284, 2012.
D. Jadhav and R. Holambe, "Feature extraction using radon and wavelet transforms with application to face recognition," Neurocomputing, vol. 72, pp. 1951-1959, 2009.
W. Zhao, G. Zhou, T. Yue, B. Yang, X. Tao, J. Huang, and C. Yang, "Retrieval of ocean wavelength and wave direction from sar image based on radon transform," in IEEE International Geoscience and Remote Sensing Symposium, 2013, pp. 1513-1516, Jul. 21-26, 2013, Melbourne, Victoria, Australia.
Y. Chen and Y. Chen, "Invariant description and retrieval of planar shapes using radon composite features, "IEEE Transactions on Signal Processing, vol. 56(10), pp. 4762-4771, 2008.
S. Tabbone, O. Terrades, and S. Barrat, "Histogram of radon transform. A useful descriptor for shape retrieval," in 19th International Conference on Pattern Recognition (ICPR 2008), Dec. 8-11, 2008, Tampa, Florida, USA. IEEE Computer Society 2008, pp. 1-4.
P. Daras, D. Zarpalas, D. Tzovaras, and M. Strintzis, "Efficient 3-d model search and retrieval using generalized 3-d radon transforms," Multimedia, IEEE Transactions on, vol. 8(1), pp. 101-114, 2006.
A. Kadyrov and M. Petrou, "The trace transform and its applications," IEEE Trans. on Pattern Analysis and Machine Intell. vol. 23, No. 8, pp. 811-828, 2001.
L. Heutte, T. Paquet, J. Moreau, Y. Lecourtier, and C. Olivier, "A structural/statistical feature based vector for handwritten character recognition," Pattern Recognition Letter, vol. 19, No. 7, pp. 629-641, 1998.
K. Jafari-Khouzani and H. Soltanian-Zadeh, "Radon transform orientation estimation for rotation invariant texture analysis," IEEE Transactions on Pattern Analysis and Machine Intelligence, vol. 27, No. 6, pp. 1004-1008, 2005.
H. Tizhoosh, "Barcode annotations for medical image retrieval: A preliminary investigation," in Image Processing (ICIP), 2015 IEEE International Conference on, pp. 818-822, Sep. 27-30, 2015, Quebec City, Quebec, CA.
H.R. Tizhoosh, S. Zhu, H. Lo, V. Chaudhari, and T. Mehdi, "MinMax Radon Barcodes for Medical Image Retrieval," Springer International Publishing, 2016, pp. 617-627.
M. Babaie, S. Kaira, K Sriram, C. Mitcheltree, S. Zhu, S. Khatami, A. Rahnamayan, an H. Tizhoosh, "Classification and retrieval of digital pathology scans: A new dataset," in Workshop for Computer Vision for Microscopy Image Analysis (CVMI 2017), CVPR, Jul. 21-26, 2017, Honolulu, Hawaii, USA.
M. Babaie, H.R. Tizhoosh, A. Khatami, and M.E. Shiri, "Local Radon Descriptors for Image Search," 7th Int. Conf. on Image Processing Theory, Tools and Applications (IPTA 2017), Nov. 28-Dec. 1, 2017, Montreal, Quebec, CA.
K. Rajendran and K. Br "Radon Transform based Local Tomography Algorithm for 3D Reconstruction, "Inn Journal of Biology and Biomedical Eng., Issue 1, vol. 6, pp. 1-8, 2012.
M. Babaie, H.R. Tizhoosh, S. Zhu, and M.E Shill, "Retrieving Similar X-Ray Images from Big Image Data using Radon Barcodes with Single Projections," Proc. 6th Int'l. Conf. on Pattern Recognition Applications and Methods (ICPRAM 2017), pp. 557-566, Feb. 24-26, 2017, Porto, Portugal.

* cited by examiner

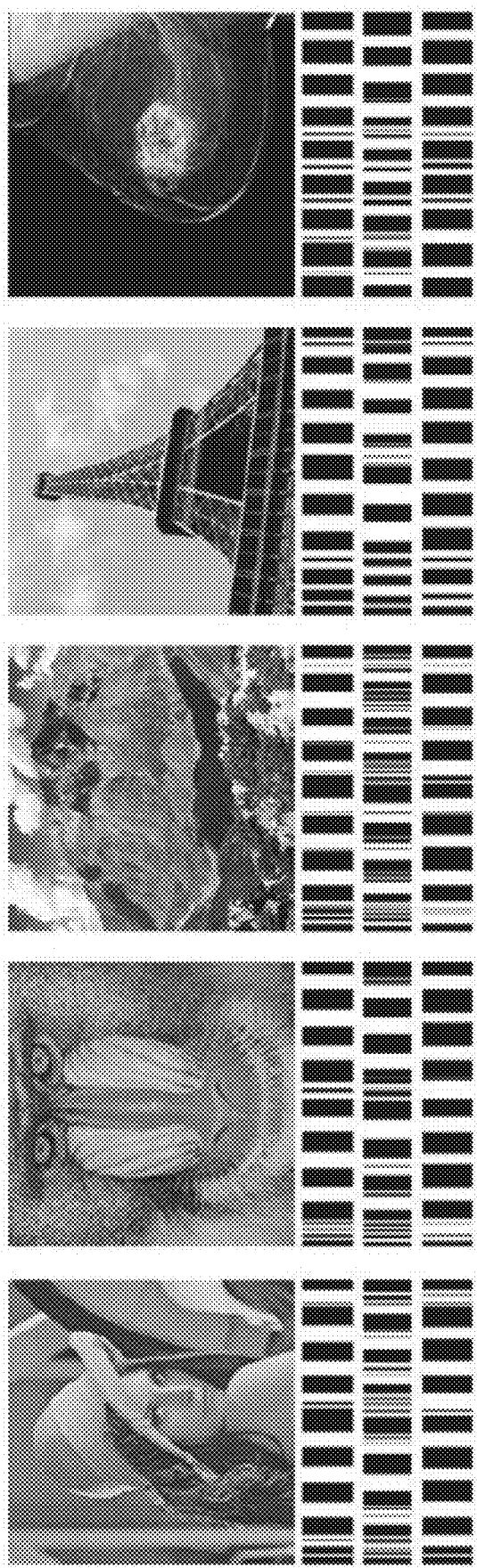

SYSTEMS AND METHODS FOR BARCODE ANNOTATIONS FOR DIGITAL IMAGES

CROSS REFERENCE TO RELATED APPLICATIONS

This application claims the benefit of priority of U.S. Provisional Patent Application No. 62/284,240 filed Sep. 24, 2015, which is hereby incorporated by reference.

FIELD

The present disclosure relates to digital imaging and the storage and search of digital images and videos.

BACKGROUND

Digital images and videos are pervasive media forms of everyday life. Most people interact with digital images and videos multiple times a day. With the increasingly large amount of image and video data being generated and consumed, people need help identifying images and video. Therefore, many mainstream image indexing, search and retrieval tools, such as Google Image Search™ for example, exist to assist in managing the large amounts of image and video data available to the public.

These types of tools also find specific applications beyond the mainstream. Imaging, particularly digital imaging, is a critical diagnostic and research instrument in modern medicine. In the medical imaging field, content-based image retrieval (CBIR), which classifies an image based on the information contained within the image itself, is typically preferable over keyword or tag descriptor-based approaches, which require manual human annotation and professional judgment.

Most known CBIR approaches (used either in medical imaging applications or in other general and specific applications) rely on some form of feature detection. Examples of feature detection-based CBIR include Scale-invariant Feature Transform (SIFT), Speeded Up Robust Features (SURF), and Binary Robust Invariant Scalable Keypoints (BRISK). The feature detection approaches are typically employed in a "bag of words" and "bag of features" model, which maps codewords or vectors to patches of an image representing the features of the image. The bag of words and bag of features models are generally designed to perform well at capturing the global appearance of the scene in an image or video frame. But these approaches may underperform in capturing spatial information and the local details of scene objects, such as the shape of a tumor in a medical imaging scan.

Furthermore, codewords and vectors used for mapping features incur large storage space requirements, which limit the real-time performance of feature detection-based CBIR systems.

Generally, in order to determine whether two images are similar, the CBIR system should preferably uniquely characterize each image such that the characterization of similar images exhibit considerable overlap. Conventional CBIR methods require sophisticated image characterization for acceptable image retrieval accuracy; however, sophisticated image characterization is inefficient and requires large data storage space and processing time.

SUMMARY

The present disclosure provides a content-based image retrieval (CBIR) system and method for mitigating at least one of the disadvantages associated with conventional feature detection-based CBIR systems. In contrast to the feature detection systems known in CBIR, the present disclosure provides a transform-based CBIR system. The transform-based CBIR system exhibits greater real-time processing performance as compared to conventional feature detection-based CBIR systems. The transform-based CBIR system may generate one or more vectors that capture the local details of scene objects and better express spatial information in the image.

In a first aspect, the present disclosure provides a content-based image retrieval (CBIR) system comprising: a database for storing comparison barcodes representative of comparison images; and a processor configured to: obtain a query image; apply a transform to the query image to generate a plurality of image transform values; threshold the plurality of image transform values to obtain compact image transform values; generate a query barcode in accordance with the compact image transform values and representative of the query image; retrieve the comparison barcodes from the database; calculate a signal distance between each comparison barcode and the query barcode; and output the comparison barcode that has the shortest signal distance to the query barcode.

In an embodiment, the transform is a Radon transform.

In an embodiment, the processor is further configured to: select a number of projections for the Radon transform; apply noise reduction to the query image; under-sample the image; and normalize pixel intensities of the query image.

In an embodiment, the processor is further configured to threshold the plurality of transform values via at least one of: local thresholding, global thresholding, incremental thresholding, and min-max thresholding.

In an embodiment, the database stores the comparison barcodes and the respective comparison images, and the processor is further configured to retrieve, from the database, the image associated with the comparison barcode that has the shortest signal distance to the query barcode, and to output the image.

In an embodiment, the database stores the comparison barcodes and the links to the locations of the externally-stored comparison images, and the processor is further configured to retrieve, from an external source, the image associated with the comparison barcode that has the shortest signal distance to the query barcode, and to output the image.

In an embodiment, the signal distance is a Hamming distance.

In an embodiment, the processor is further configured to compress the plurality of image transform values using an artificial neural network.

In a second aspect, the present disclosure provides a content-based image retrieval (CBIR) system comprising: a database for storing comparison barcodes representative of comparison images; and a processor configured to: obtain a query image; select a number of projections for a Radon transform; apply the Radon transform to the query image to generate a plurality of Radon projection functions; threshold the plurality of Radon projection functions to generate a plurality of Radon projection barcodes; retrieve the comparison barcodes from the database; calculate a signal distance between each comparison barcode and each projection barcode; for each comparison barcode, sum all signal distances calculated from comparing the same comparison barcode to each of the projection barcodes to generate a total signal distance value for each comparison barcode, resulting in a plurality of total signal distance values for all of the comparison barcodes; and output the comparison barcode that has the shortest total signal distance.

In an embodiment, the processor is further configured to threshold the plurality of transform values via at least one of: local thresholding, global thresholding, incremental thresholding, and min-max thresholding.

In an embodiment, the database stores the comparison barcodes and the respective comparison images, and the processor is further configured to retrieve, from the database, the image associated with the comparison barcode that has the shortest signal distance to the query barcode, and to output the image.

In an embodiment, the database stores the comparison barcodes and the links to the locations of the externally-stored comparison images, and the processor is further configured to retrieve, from an external source, the image associated with the comparison barcode that has the shortest signal distance to the query barcode, and to output the image.

In an embodiment, the signal distance is a Hamming distance.

In an embodiment, the processor is further configured to compress the plurality of Radon projection functions using an artificial neural network.

In a third aspect, the present disclosure provides a content-based image retrieval (CBIR) system comprising: an imaging device for generating an image; a database for storing a barcode representative of the image; a display for displaying the barcode; and a processor configured to: obtain the image from the imaging device; apply a transform to the image to generate a plurality of image transform values; threshold the plurality of image transform values to obtain compact image transform values; generate a barcode in accordance with the compact image transform values and representative of the image; transmit the barcode to the database for storage; and draw the barcode on the display.

In an embodiment, the transform is a Radon transform.

In an embodiment, the processor is further configured to: select a number of projections for the Radon transform; apply noise reduction to the image; under-sample the image; and normalize pixel intensities of the image.

In an embodiment, the processor is further configured to threshold the plurality of transform values via at least one of: local thresholding, global thresholding, incremental thresholding, and min-max thresholding.

In an embodiment, the processor is further configured to compress the plurality of image transform values using an artificial neural network.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIGS. 10 to 14 are examples of sample images and their corresponding Radon barcodes according to an embodiment of the present disclosure.

DETAILED DESCRIPTION

The present disclosure provides a content-based image retrieval (CBIR) system and method. The CBIR system generates a relatively short vector or array of data from an input image. The short vector or array data can be used to represent the content of the image for image retrieval purposes. In contrast to conventional feature detection-based methods, a transform operation is applied to the image to generate the vector or array data. The transform operation is a more efficient method of extracting relevant image information for image retrieval applications.

Figure 1:
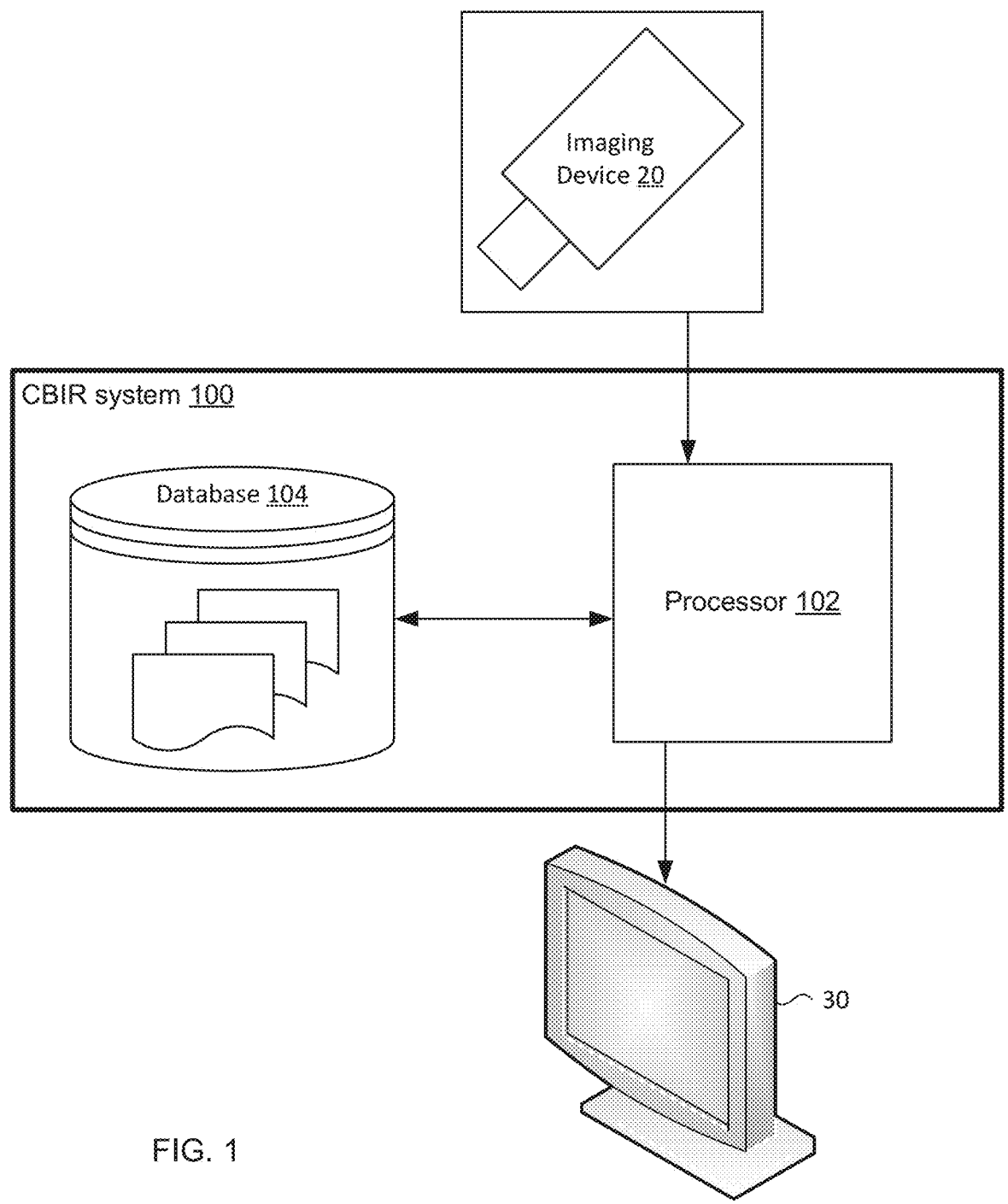
FIG. 1 is a schematic diagram of a CBIR system according to an embodiment of the present disclosure.

FIG. 1 is a schematic diagram of a CBIR system according to an embodiment of the present disclosure. The CBIR system 100 comprises a processor 102 in communication with a database 104. The database 104 includes associations between images and CBIR data structures (CBIR data structures can be referred to as "barcodes") according to embodiments of the present disclosure. Associations in the database may be in the form of a relation or table in a relational database. For example, a table in a relational database may comprise at least two columns and at least one row. One of the at least two columns represents an attribute identifying the image (such as filename, message digest or hash, etc.) and another of the at least two columns represents an attribute identifying the barcode, or the binary value of the barcode itself. Each row in the relational database thus represents an association between an image and a barcode. While other database structures are known and may be suitable for implementation in the CBIR system 100, the relational database model is the most popular implementation in current practice.

The database 104 may be fully or partially populated by image data provided to the database by the processor 102; the database 104 may also be fully or partially pre-populated with reference images and barcodes. When images are associated with barcodes, the images are said to be "indexed." Thus, creating the barcodes and the associations is a process of indexing the images. As will be described below, barcodes are determined in accordance with one or more transform operations of the image or a region of the image. Associating the barcode with the image maps the barcode to the image so that the content of the barcode may be used to represent the content of the image. A database of indexed images, or of links to indexed images, is used in a CBIR system to compare and retrieve similar or relevant images.

In an indexing operation, the processor 102 may populate the database 104 by receiving an image and processing the image according to various CBIR methods of the present disclosure. The processor 102 generates a barcode from the image received from the imaging device 20 and saves the barcode and the association in the database 104. The processor 102 may also save the image in the database for faster image retrieval at the cost increased storage space requirements; in this case, the barcode may be embedded as metadata in the digital image file.

In an image search and retrieval operation, the processor 102 may retrieve an indexed image or image-barcode association from the database 104 based on an image query. In this operation, the processor 102 receives a query image and generates a barcode from the query image. The processor 102 searches the database 104 for one or more similar stored barcodes as compared to the barcode generated from the query image. The similar stored barcode(s) point to images stored locally in the database 104 or externally elsewhere, which may be provided to a user running the image query search.

The similarity of the barcode retrieved from the database and the barcode generated from the query image can be based on the difference of bit values (signal distance) between the barcodes. In an embodiment further discussed below, the similarity between the barcodes may be based on a Hamming distance calculation.

The image(s) associated with the similar stored barcode(s) is useful to the user running the image query search on the CBIR system 100. In the medical imaging context, a medical professional (radiologist, diagnostician, researcher, etc.) may scan a patient and use the image to search for more information about the patient's illness. In an exemplary CBIR system, the database 104 also stores case data for each image or barcode; therefore, when the CBIR system returns the one or more similar images, the related case data is very likely relevant to the current patient's case.

For example, a query image showing the size, shape and location of a tumor may be input to the CBIR system 100 for search and retrieval of similar images. A number (e.g., an arbitrary number, 10) of most similar images are found and retrieved by the CBIR system 100 according to embodiments of the present disclosure. These images also contain tumors of similar size, shape and location in the patient's body; therefore, the medical case information related to these similar images is of great relevance to the current patient's case. When the user receives the most similar images from the CBIR system 100, the user may optionally receive or look up the medical case information of each similar image. Accordingly, the user can see how previous patients with a similar tumor were diagnosed, treated and evaluated.

The system 100 may be connected to an imaging device 20 so that the processor 102 can receive digitized images directly from the imaging device 20. In this configuration, the system 100 may process query images, generate CBIR barcodes, and retrieve similar images in real-time or nearly in real-time, as the query images are being received from the imaging device 20. It should be appreciated that real-time, or near real-time, CBIR processing and retrieval improves patient care and responsiveness.

In the context of the present disclosure, real-time or near real-time is defined as CBIR image processing that is concurrent to, or within a small temporal window of, the query image acquisition or generation. The purpose of real-time or near real-time CBIR image processing is to deliver CBIR search and retrieval results from the CBIR system 100 to the user within seconds or minutes after a medical imaging scan of the patient. Accordingly, related medical case information may be delivered to the patient's doctor with minimal delay, for a timely diagnosis of the patient's illness.

Alternatively, images may be loaded into the system 100 from a storage device (not shown) separate from the CBIR system 100. In this configuration, the CBIR system 100 may be used to process offsite data. Processing offsite data or non-time-sensitive data is suited to research applications where real-time processing (i.e., concurrent to image acquisition or generation) is not necessary. Although the system 100 may be used to process images from a storage device, rather than directly from the imaging device 20, it should be appreciated that the advantages of real-time processing discussed above are equally beneficial to offsite processing of non-time-sensitive data. Specifically, a researcher tasked with processing hundreds or thousands of medical images would still benefit from the increased processing speed of the CBIR system 100 over conventional feature detection-based CBIR systems, even if the hundreds or thousands of medical images are not related to any patients awaiting diagnosis.

The system 100 may also be connected to a display 30, which can be used to present image query results to the user. The results can include useful information such as a link to the similar image(s) or a copy of the similar image(s), and the related case data that may be relevant to a current patient's case.

In an embodiment, the CBIR system 100 is DICOM (Digital Imaging and Communications in Medicine) standard-compatible so that the system 100 can directly communicate with DICOM standard imaging devices 20 such as X-ray, CT, Ultrasound, and MRI machines.

Figure 2:
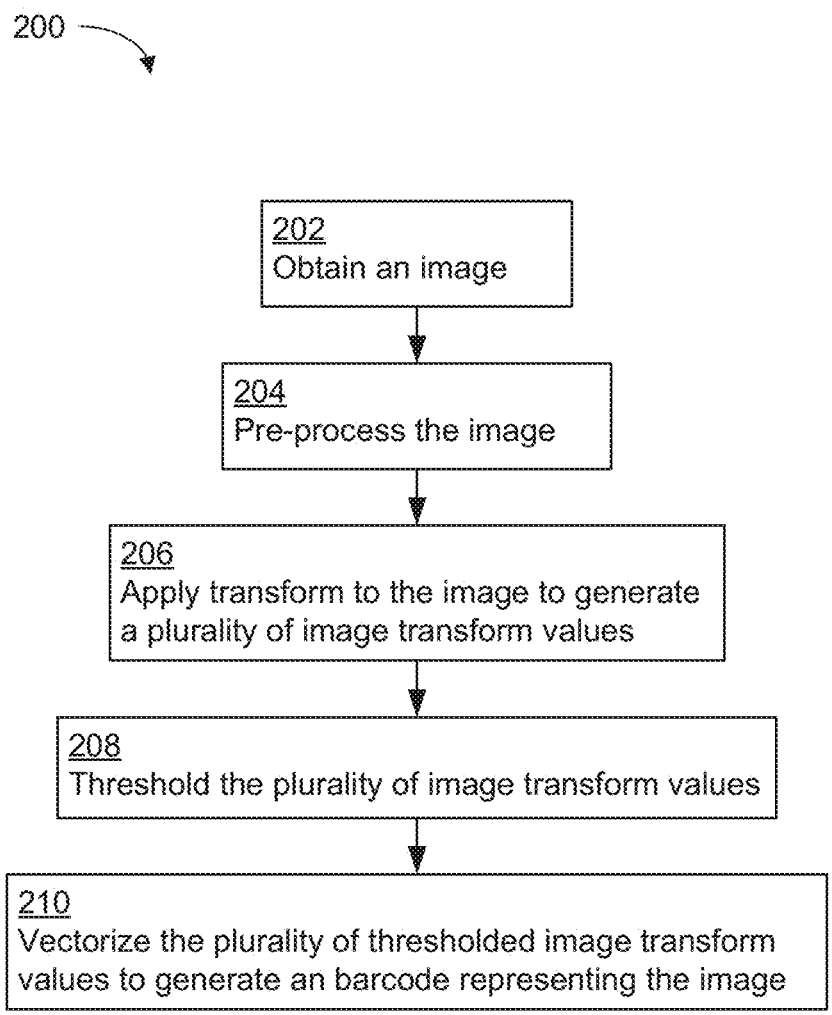
FIG. 2 is a flowchart diagram of a general transform-based CBIR method for generating a barcode according to an embodiment of the present disclosure.

FIG. 2 is a flowchart diagram of a general transform-based CBIR method for generating a barcode according to an embodiment of the present disclosure. The method 200 comprises, at 202 initially receiving an image for CBIR processing.

The received image may be of any suitable size and quality because these and other variables may be adjusted in one or more pre-processing stages at 204. Examples of possible image pre-processing include normalizing the pixel dimensions of the image and digital filtering for noise reduction.

A typical digital image data structure comprises an intensity value at each pixel location. In order to capture a wide dynamic range of intensity values, the data structure of the digital image uses a number of data bits to represent each pixel. At 206, the CBIR system applies a transform to the pre-processed image to generate a plurality of transform values. The transform values extract relevant image information features from the intensity values and the data structure of the pre-processed digital image. The transform values may also compress the image information contained within the intensity values and the data structure of the pre-processed digital image. The nature of the extracted features and/or compressed information depends upon the particular transform used to generate the transform values. Examples of possible transforms include Fourier, Wavelet, Cosine, Haar, Gabor, and Radon transforms. For the Radon transform, as an example, the transform integrates (sums) the pixel values along parallel lines for each given angle.

Next, the transform values are thresholded at 208 to generate compact (e.g., binary, ternary, etc.) values. Thresholding the transform values further compresses the image information. In the context of the present disclosure, thresholding means reducing the dynamic range of the input values via some binning procedure to generate a more limited range of output values.

In an embodiment, thresholding generates binary or ternary values, which may be expressed using one or two bits per compact value. The reduced bit size of the compact values, as compared to the transform values, results in a barcode that is much smaller in file size as compared to the data structures of conventional feature detection-based CBIR systems. Thus, the CBIR system 100 has improved storage capacity of barcodes and improved real-time processing performance for searching barcodes and retrieving images. Examples of suitable thresholding methods include local or global thresholding, incremental thresholding, and min-max thresholding.

Finally, at 210, the compact values are assembled to generate the CBIR barcode according to embodiments of the present disclosure. Assembling the compact values into the barcode comprises appending each of the compact values in a specified order, creating a vector or array data structure, which is named the "barcode" herein. Though the barcodes shown in the present disclosure resemble common consumer product codes used for retail scanning machines, they are shown in this manner for visualization and demonstration purposes only. It should be understood that many different physical representations of the barcode are possible and that creating the barcode at 210 only requires generating vector or array data, which can be a digital code stored in a computer memory for use in the CBIR system.

The barcode is a relatively small data structure yet captures the distinguishing features of the image information from the raw digital image. Thus, the barcode can represent the raw image for CBIR purposes such as image search, comparison, and retrieval.

Figure 3:
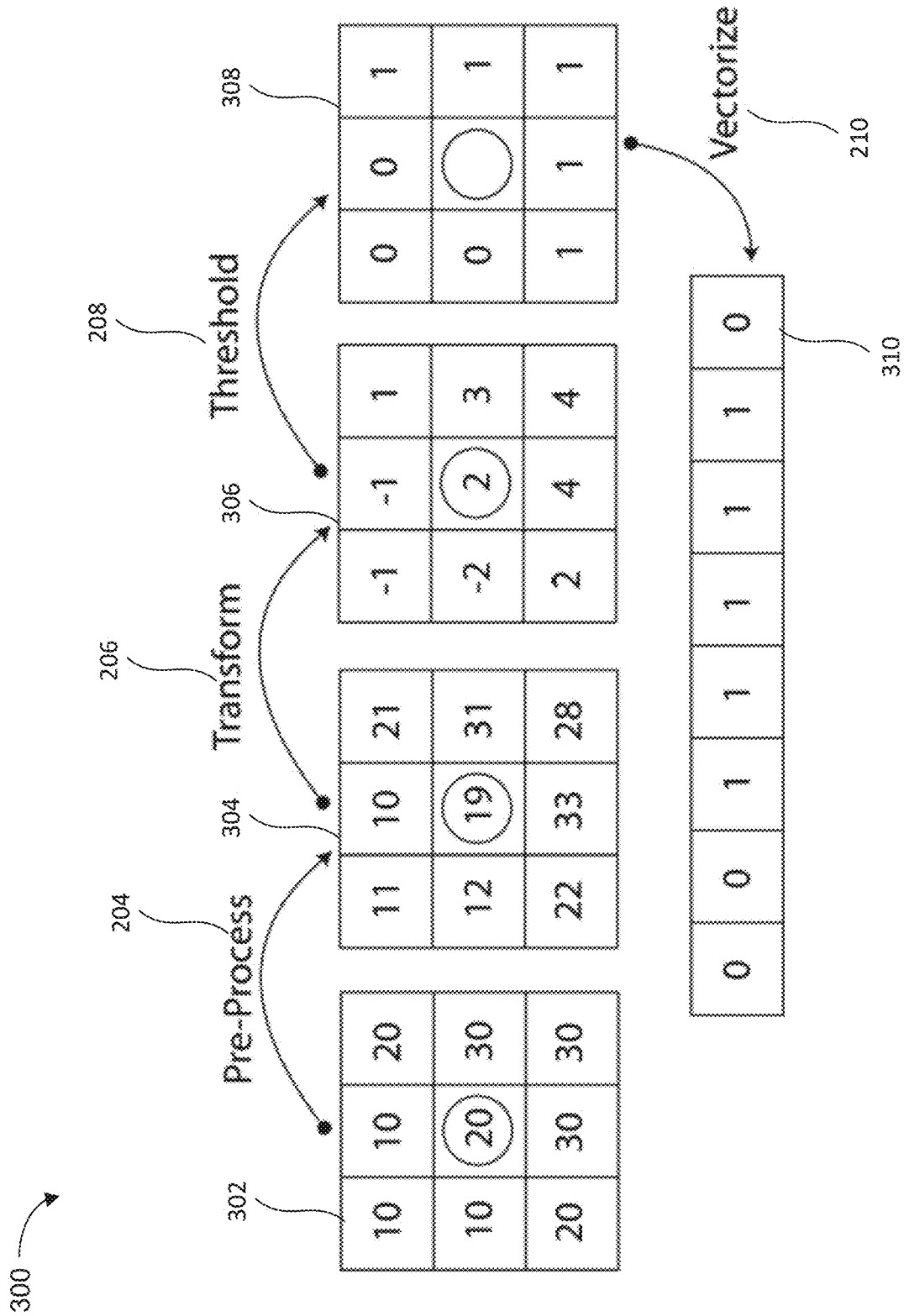
FIG. 3 is a schematic diagram illustrating some of the operation of the method of FIG. 2.

FIG. 3 is a schematic diagram illustrating some of the operations of the method 200. The operation 300 is a simplistic example only and shows a basic raw digital image 302 for demonstration purposes.

Pre-processing 204 converts the raw image 302 into a pre-processed image 304. The pre-processed image 304 has slightly adjusted intensity values at many pixel locations, and may represent noise reduction, under-sampling and/or normalization procedures.

While not shown in operation 300, pre-processing 204 may also include normalizing the raw image 302. In this case, the raw image could have dimensions that are incompatible for the transform process 206. For example, if the raw image is 512 pixels wide by 512 pixels high, pre-processing 204 may reduce the dimensions to a 64-by-64 square, resulting in the pre-processed image.

The transform process 206 extracts image information features from the pre-processed digital image 304. Examples of extracted image information features include edges in different directions of the image or Radon projections of the image from different angles. Radon projections are discussed in greater detail below. In operation 300, the transform values 306 retain the spatial mapping to the pixels locations in the raw image 302.

Thresholding 208 compresses the image information into a binary or ternary format as compact values 308. The compact values 308 may then be assembled 210 in order to generate the barcode 310. The data format of the barcode 310 is a vector or array. The order of the data in the vector or array captures spatial information in the image; thus, the compact values 308 are assembled in a consistent and specific manner to generate the barcode 310.

Figure 4:
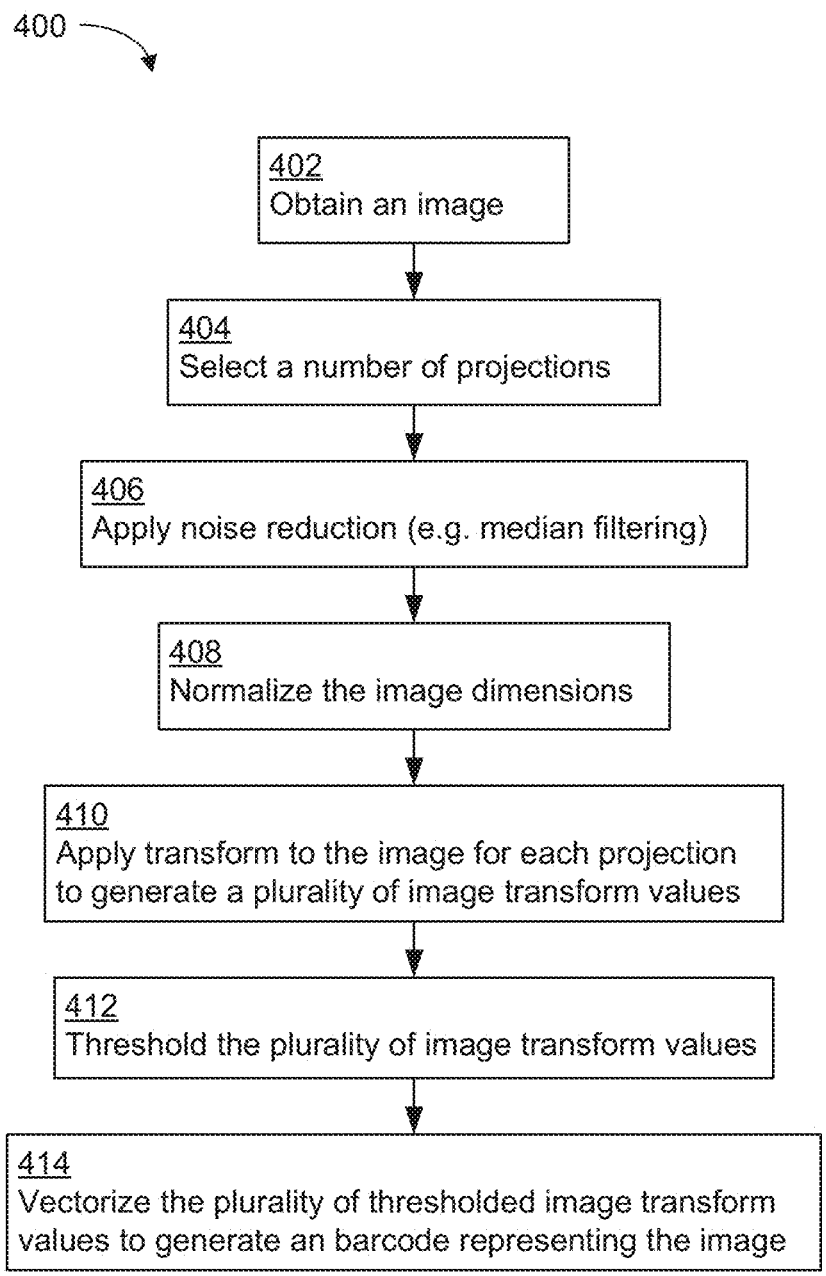
FIG. 4 is a flowchart diagram of a Radon transform-based CBIR method for generating a barcode according to an embodiment of the present disclosure.

FIG. 4 is a flowchart diagram of a Radon transform-based CBIR method 400 for generating a barcode according to an embodiment of the present disclosure. According to the method 400, the barcode may be known as a "Radon barcode." The method 400 comprises, at 402 initially obtaining an image for CBIR processing. The received image may be of any suitable size and quality because these and other variables may be adjusted in one or more pre-processing stages.

The Radon transform involves creating projection data by integrating the intensity values of the image across parallel lines at positions ρ and perpendicular to the width of the image when rotated at an angle θ. At 404, a number of projections are selected to determine how many different angles of rotation θ will be used in the Radon transform operation. The number of projections influences the size and complexity of the resultant Radon barcode. Other parameters may also be selected at 404 such as image size after normalization and the number of positions ρ for the line integral of the Radon transform, for example.

In an embodiment, the number of projections and the angle of each projection are selected according to an optimization method (not shown). Well-known optimization methods such as evolutionary algorithms, expectation maximization, and simulated annealing can be implemented in the CBIR system to select various parameters used for generating good Radon barcodes.

At 406, the raw digital image is pre-processed to reduce noise. An example of a common noise reduction method is median filtering. Pre-processing at 406 may include or substitute other digital filtering techniques for normalization and noise reduction.

At 408, the digital image is normalized so that the height and width dimensions are equal (i.e., the image is resized to a square) and so that the digital image has a pixel width and height that is compatible with the previously selected Radon transform parameters. For example, the image may be normalized to at least 512 pixels wide by 512 pixels high when the image is used for pathology, whereas the image may be normalized down to 32 pixels wide by 32 pixels high when the image is used for global similarity search in radiology.

At 410, the CBIR system applies a Radon transform to the pre-processed and normalized image to generate a plurality of transform values. The Radon transform projects the image at different angles, and sums the intensity values of the pixels along lines of each projection.

More specifically, the image is a function $f(x,y)$. The Radon transform projects $f(x,y)$ along a number of projection angles. Each projection is the integral of the values of $f(x,y)$ along lines constituted by each angle θ. The projection creates a new image $R(\rho,\theta)$ where $\rho = x \cos\theta + y \sin\theta$. Hence, using the Dirac delta function $\delta(\cdot)$ the Radon transform can be written as $$R(\rho, \theta) = \int_{-\infty}^{+\infty} \int_{-\infty}^{+\infty} f(x, y)\delta(\rho - x \cdot \cos\theta - y \cdot \sin\theta) dx dy \quad \text{Equation 1}$$

Each projected image $R(\rho,\theta)$ is a two-dimensional function containing a large range of values. Projecting and integrating the pixel image into the plurality of Radon projections extracts useful image information features from the intensity values in the digital image. Integrating the pixel values along each projection also compresses the image information contained within image.

At 412, thresholding the Radon projections further compresses the image information. In an embodiment, the thresholding is a binarization operation for generating binary valued outputs from multi-valued inputs. In another embodiment, the thresholding is a ternarization operation for generating ternary valued outputs from multi-valued inputs. The binary valued outputs and ternary valued outputs may be respectively expressed using one or two bits per compact value. The reduced bit size of the compact values, as compared to the transform values, results in a barcode that is much smaller in file size as compared to the data structures of other CBIR systems, improving storage capacity and real-time processing performance. Examples of suitable thresholding methods include local or global thresholding, incremental thresholding, and min-max thresholding, which are discussed in further detail below in relation to FIGS. 7, 8, and 9.

Finally, at 414, the compact values are assembled into the CBIR barcode according to the present disclosure. The barcode is in the format of a vector or array and is a relatively small data structure yet captures the distinguishing features of the image information from the raw digital image. Thus, the barcode can represent the raw image for CBIR purposes such as image search, comparison, and retrieval.

In a further embodiment, the CBIR method optionally comprises additional compression of the transform values generated at 410. Prior to the thresholding at 412, the CBIR method inputs the transform values to a deep learning algorithm (not shown) using, for example, an auto-encoder or a convolutional neural network, to generate compressed transform values. An auto-encoder is a type of feed-forward artificial neural network comprising multiple processing layers and typically used for machine learning and reducing the dimensionality of data. A convolutional neural network is another type of feed-forward artificial neural network comprising multiple layers based on biological processes.

In the case of the auto-encoder implementation, after the Radon transform is applied to the image to generate the Radon projections, the Radon projections may be input into an auto-encoder with 3, 5, or 7 layers. The output of the deepest layer is then binarized and vectorized to generate the Radon barcode.

In the case of the convolutional neural network implementation, the Radon transform of the image at several projection angles is input to the convolutional neural network, and the fully connected layer before the output layer is then binarized and vectorized to generate the Radon barcode.

Figure 5:
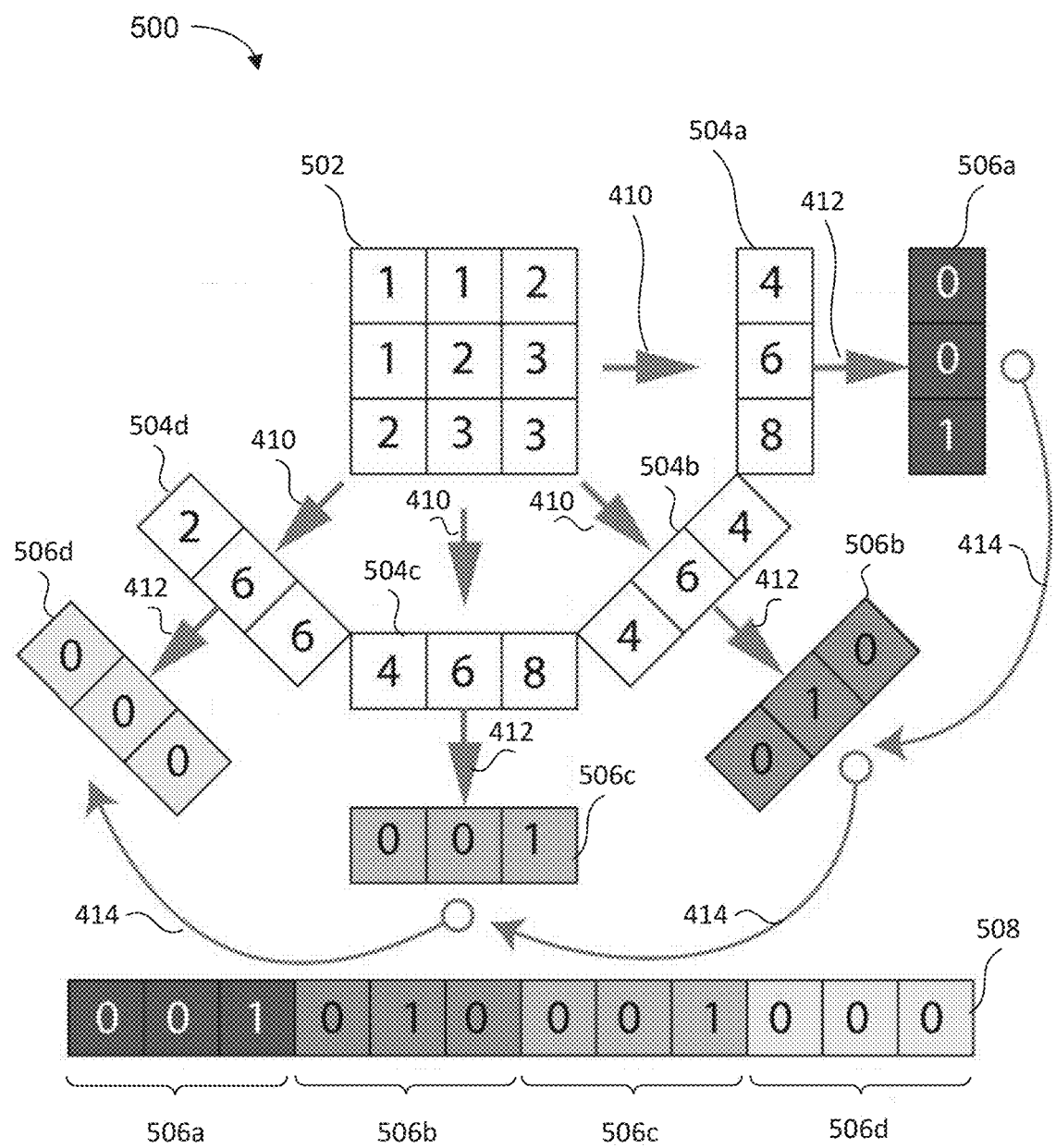
FIG. 5 is a schematic diagram illustrating some of the operation of method of FIG. 4.

FIG. 5 is a schematic diagram illustrating some of the operation of method 400. The operation 500 is a simplistic example only and shows a basic pre-processed image 502 for demonstration purposes.

Pre-processing and projection selection are not shown in operation 500. For the purpose of this example, assume the image 502 was already normalized to compatible dimensions of three-by-three pixels and that four projections were selected at four different angles θ: 0 degrees, 45 degrees, 90 degrees, and 135 degrees.

The transform process 410 generates Radon projections 504*a*, 504*b*, 504*c*, and 504*d* at projection angles θ=0 degrees, θ=45 degrees, θ=90 degrees, and θ=135 degrees, respectively. The Radon projections 504*a*, 504*b*, 504*c*, and 504*d* contain extracted and compressed image information. Each Radon projection comprises three values, each value representing a sum over a projection line at one of the three positions ρ and perpendicular to the width of the image when rotated at an angle θ given by the selected projection. The magnitude and position of each value in each Radon projection captures spatial information about the content of the raw digital image. The values in Radon projections 504*a*, 504*b*, 504*c*, and 504*d* range from 2 to 8.

Thresholding 412 compresses the values in Radon projections 504*a*, 504*b*, 504*c*, and 504*d* to the binary range of 0 and 1, as shown in compact values 506*a*, 506*b*, 506*c*, and 506*d*. Thresholding further compresses the image information yet the binary magnitude and position of each bit of the compact values still capture spatial information about the content of the raw digital image. At 414, the compact values 506*a*, 506*b*, 506*c*, and 506*d* may then be appended together in a specific order to generate the Radon barcode 508.

Figure 6:
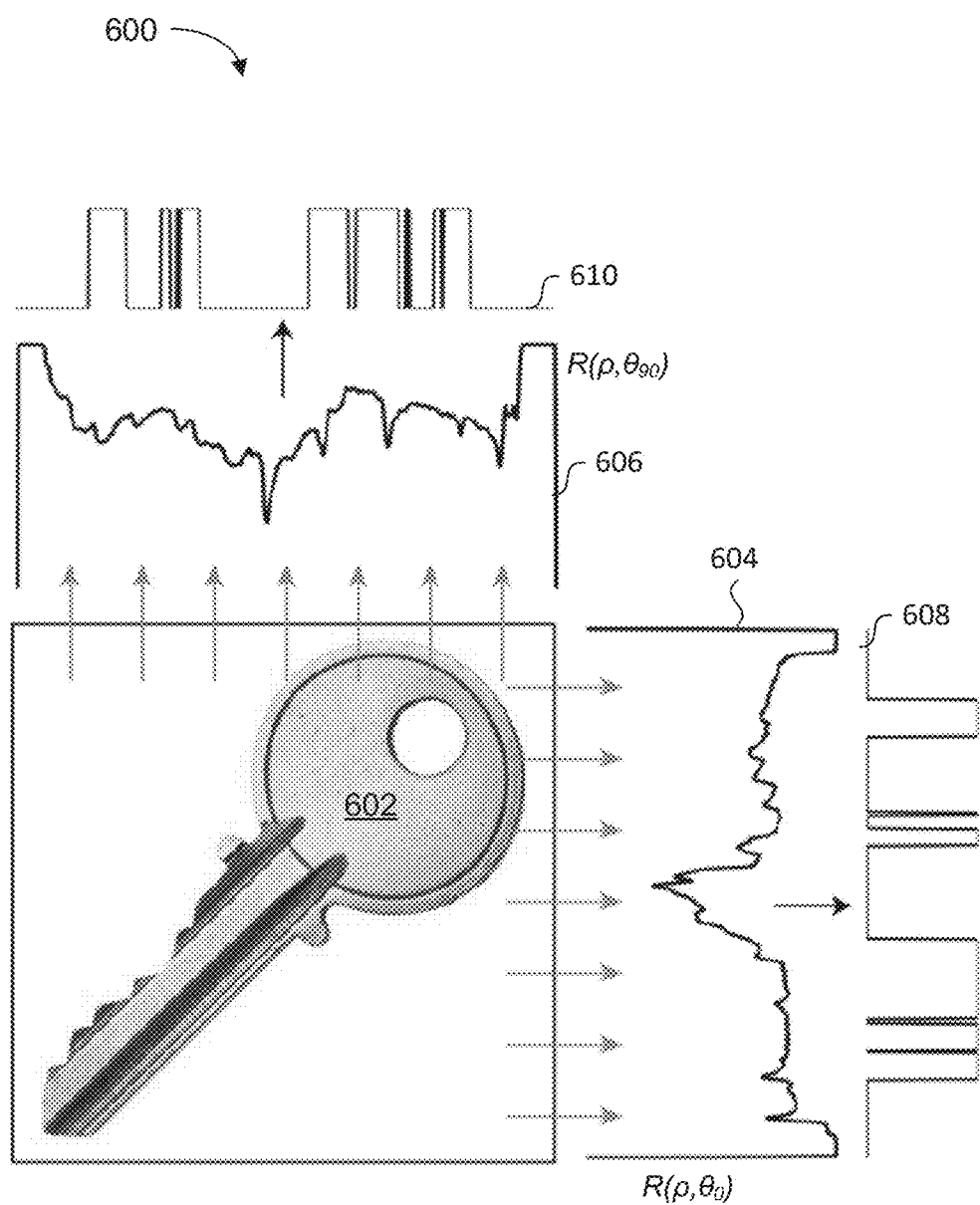
FIG. 6 is another schematic diagram illustrating the operation of the method of FIG. 4 using a grayscale image of a household key.

FIG. 6 is another schematic diagram illustrating the operation of method 400 using a grayscale image of a household key. The image 602 of the key is already preprocessed for noise reduction and normalization (not shown). The image 602 contains hundreds of pixels, each pixel defining a two-dimensional location and an intensity value.

Two Radon projections are selected: at 0 degrees and 90 degrees. A first Radon projection 604 is generated by integrating the pixel intensity values of the image 602 along horizontal lines. In the first Radon projection 604, the angle θ=0 degrees and the horizontal lines (in practice, more than shown in FIG. 6) represent the positions ρ at which the line integral is taken.

A second Radon projection 606 is generated by integrating the pixel intensity values of the image 602 along vertical lines. In the second Radon projection 606, the angle θ=90 degrees and the vertical lines (in practice, more than shown in FIG. 6) represent the positions ρ at which the line integral is taken.

Due to the large number of pixels in the image 602 (as compared to the simplistic images 302 and 502 represented FIGS. 3 and 5), each Radon projection 604 and 606 appears to resemble a continuous function in FIG. 6; in practice, however, each Radon projection 604 and 606 is a discrete function.

Each Radon projection 604 and 606 is binarized via a chosen thresholding method to generate compact values 608 and 610, respectively. These compact values 608 and 610 are essentially partial Radon barcodes; thus, appending the compact values 608 and 610 together creates the full Radon barcode.

Figure 7:
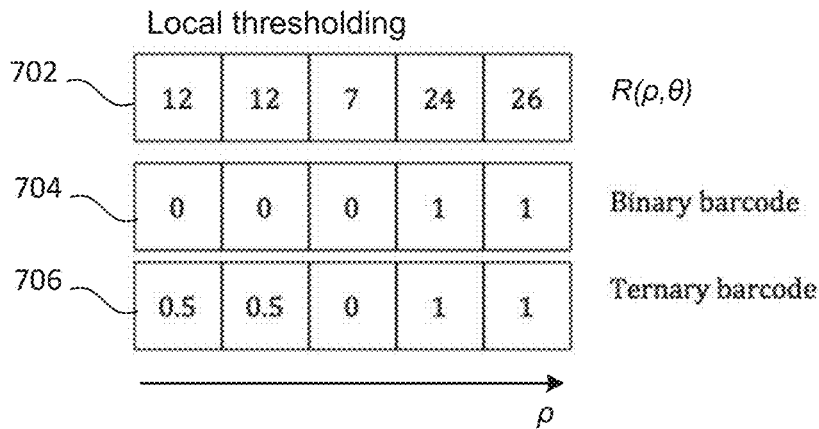
FIG. 7 is a schematic diagram of local thresholding according to an embodiment of the present disclosure.
Figure 8:
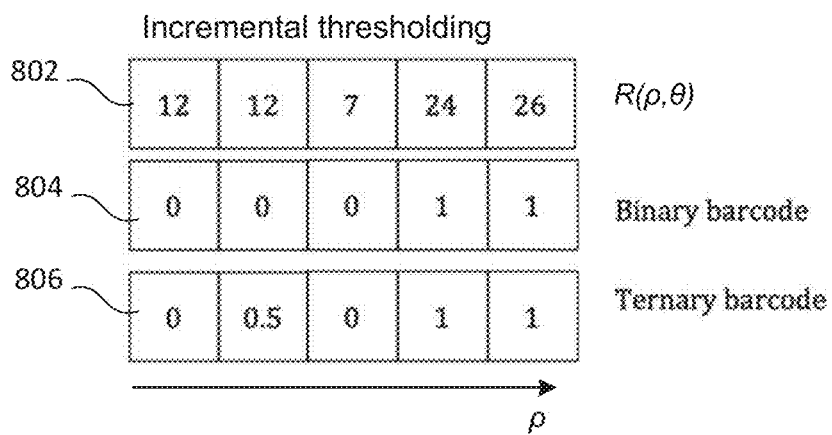
FIG. 8 is a schematic diagram of incremental thresholding according to an embodiment of the present disclosure.
Figure 9:
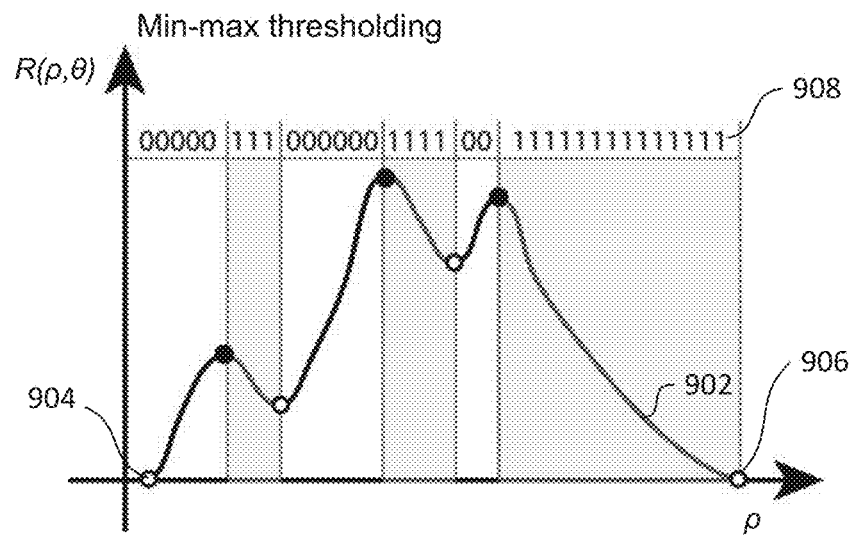
FIG. 9 is a graph illustrating a method of min-max thresholding according to an embodiment of the present disclosure.

FIGS. 7, 8 and 9 show three different methods of thresholding according to embodiments of the present disclosure. FIG. 7 is a schematic diagram of local thresholding according to an embodiment of the present disclosure. A Radon projection 702 $R(\rho,\theta)$ has 5 values {12, 12, 7, 24, 26}, one value for each position ρ; thus, the Radon projection has a local median value of 12. By assigning a "0" to Radon projection values less than or equal to the median value, and by assigning a "1" to Radon projection value greater than the median value, a binary barcode 704 may be generated.

By assigning a "0" to Radon projection values less than the median value, assigning a "0.5" to Radon projection values equal to the median value, and by assigning a "1" to Radon projection value greater than the median value, a ternary barcode 706 may be generated.

The local thresholding method according to FIG. 7 may be extended to global thresholding (not shown). In this case, the median value is calculated from all of the plurality of Radon projections, rather than a single Radon projection or a local part of a Radon projection.

FIG. 8 is a schematic diagram of incremental thresholding according to an embodiment of the present disclosure. A Radon projection 802 R($\rho,\theta$) has the same 5 values as 702 {12, 12, 7, 24, 26}, one value for each position $\rho$, and the same median value of 12. The thresholding process begins at a first value and proceeds incrementally through all of the values until the end of the Radon barcode 802.

Starting at the leftmost value, a "0" is initially assigned. In the thresholding method of generating a binary barcode 804, the next value to the right is assigned a "0" if the value is less than or equal to the previous value, and assigned a "1" if the next value is greater than the previous value. In the thresholding method of generating a ternary barcode 806, the next value to the right is assigned a "0" if the value is less than the previous value, assigned a "0.5" if the next value is equal to the previous value, and assigned a "1" if the next value is greater than the previous value.

FIG. 9 is a graph illustrating a method of min-max thresholding according to an embodiment of the present disclosure. First, the Radon projection R($\rho,\theta$) is smoothed to generate a smooth function 902. Next, the smooth function 902 is traversed from a first end to the other end to detect all local extrema (i.e., maxima and minima, or peaks and valleys). Starting at the first end 904 and proceeding to the other end 906, bins between minima-to-maxima are filled with "0" and bins between maxima-to-minima are filled with "1." The result is a binary barcode 908.

FIGS. 10 to 14 are examples of sample images and their corresponding Radon barcodes according to an embodiment of the present disclosure. Though the barcodes shown in each of FIGS. 10 to 14 resemble common consumer product codes used for retail scanning machines, it would be understood that many different physical representations of the barcode are possible; the barcodes of FIGS. 10 to 14 are shown in this manner for visualization and demonstration purposes only. Furthermore, the barcode may only be a digital code stored in a computer memory for use in the CBIR system, and therefore needs not have a physical form.

FIGS. 10 to 14 also show that the CBIR system of the present disclosure may be used for general applications (people, animals, landscapes, structures, etc.) and more specific applications, such as medical imaging.

Figure 15:
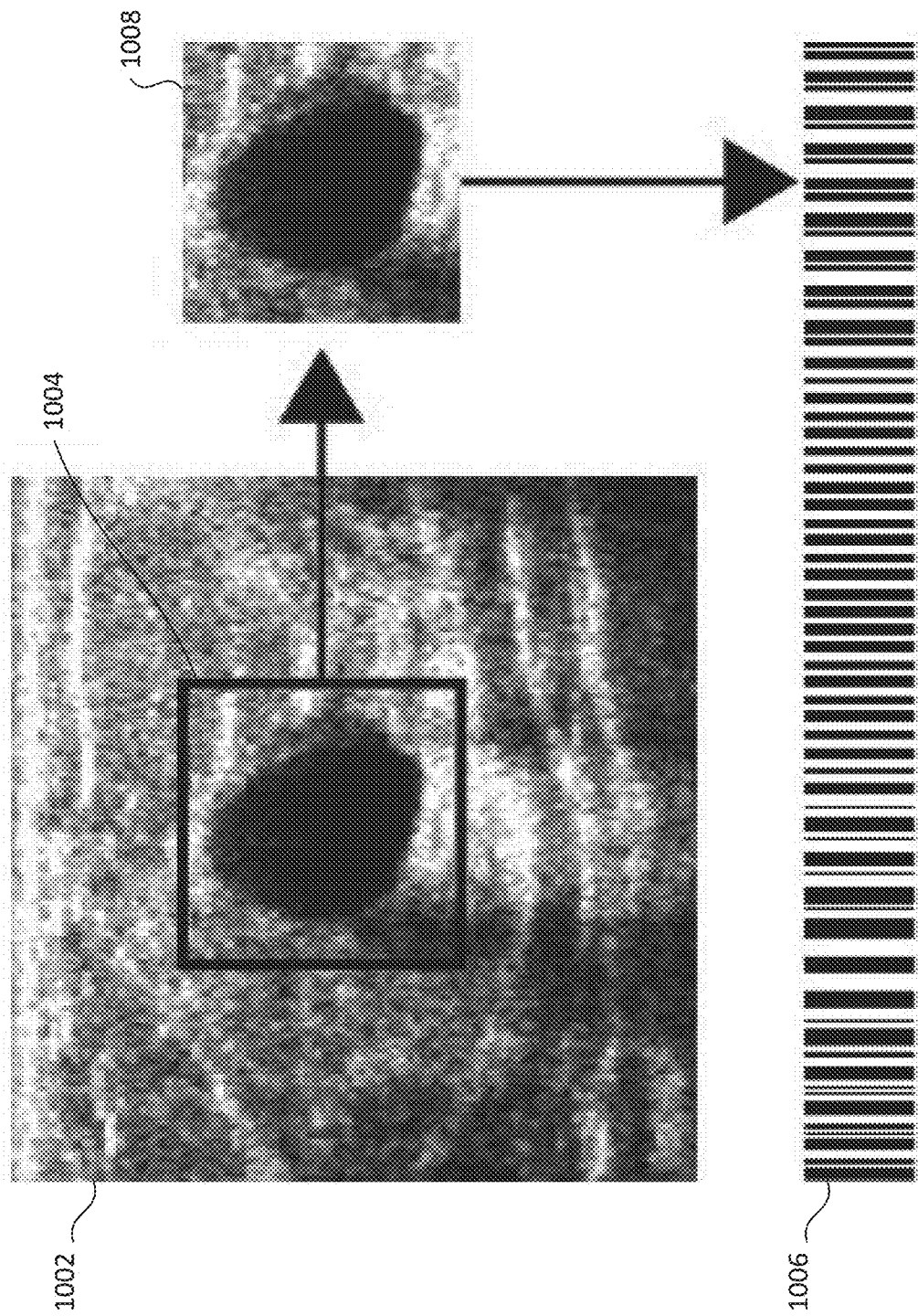
FIG. 15 is a diagram of a further advanced operation of the CBIR system of FIG. 1 according to an embodiment of the present disclosure.

FIG. 15 is a schematic diagram illustrating the selection of a region of interest (ROI) of an image, such as a tumor in a medical image, and generating barcode from the ROI according to an embodiment of the present disclosure. In a further embodiment, after initially receiving the raw digital image 1002, the CBIR system selects a ROI 1004 of the image for further pre-processing, transform generation, thresholding, and vectorizing. In other words, the CBIR system can generate a barcode 1006 from a subset 1008 of a received digital image.

The selection of the ROI may be made by a user and/or may be automatically generated by the CBIR system. Automatic ROI generation may rely on conventional feature detection methods to suggest possible ROIs for the user to select.

Figure 16:
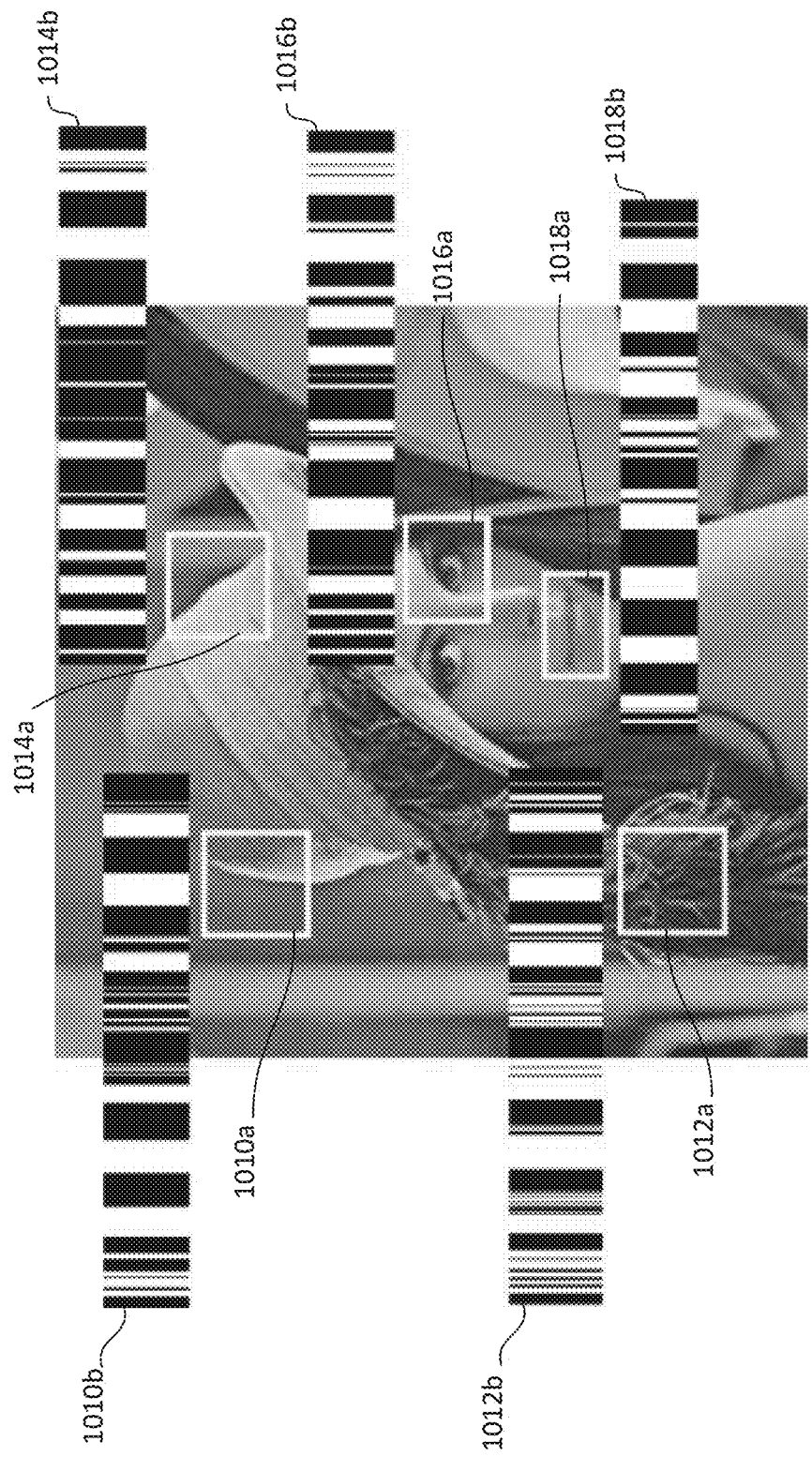
FIG. 16 is a diagram showing potential regions of interest (ROI) of an image.

FIG. 16 is a diagram showing potential ROIs either selected by a user or automatically generated by the CBIR system for suggestion to the user. FIG. 16 also shows sample regions of interest 1010*a*, 1012*a*, 1014*a*, 1016*a*, and 1018*a* corresponding to each respective sample Radon barcode 1010*b*, 1012*b*, 1014*b*, 1016*b*, and 1018*b*.

Figure 18:
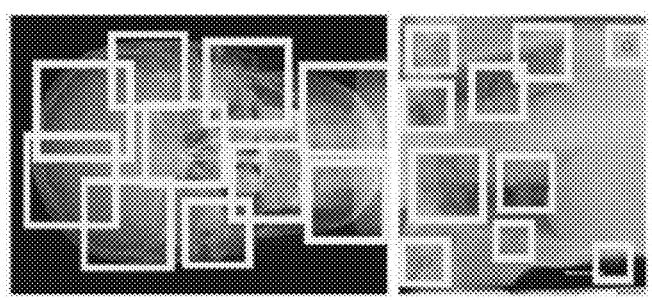
Figure 17:
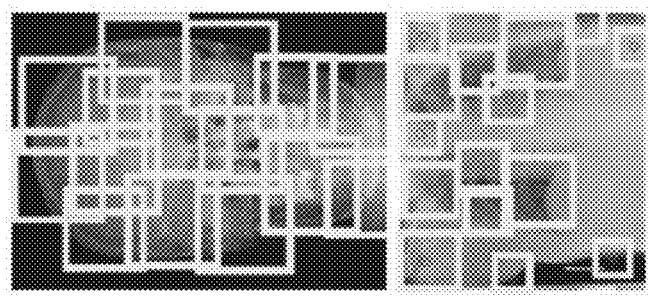

FIGS. 17 to 21 are diagrams showing various examples of automatically-generated ROIs. FIG. 17 is a sample image of a head and chest X-ray. FIG. 18 is the head and chest X-ray showing Harris features, which are automatically-generated features that show the locations of corners detected in the X-ray image.

Automatically grouping features, such as the Harris features of FIG. 18, can allow for automatic identification of ROIs. Density clustering, such as K-means clustering may be used to group dense clusters of Harris features for automatically generating ROIs.

Figure 21:
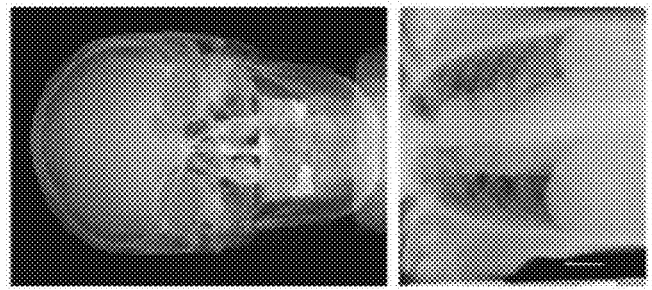
FIGS. 17 to 21 are diagrams showing various examples of automatically-generated ROIs.
Figure 20:
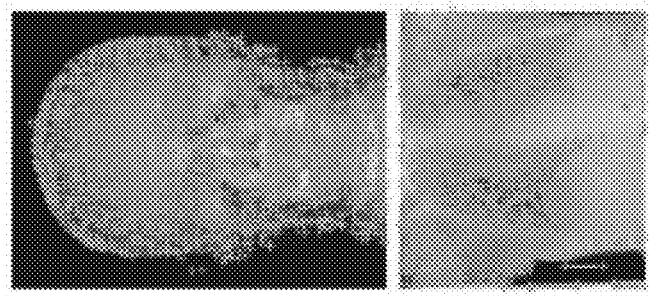
Figure 19:
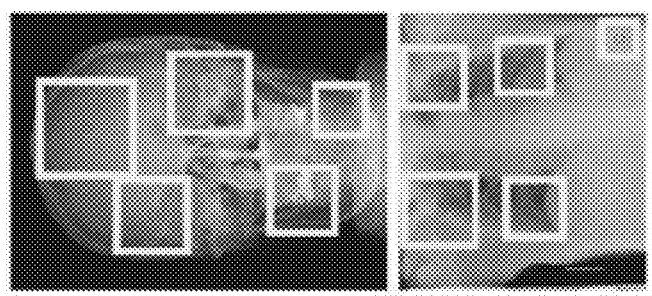

FIG. 19 is a head and chest X-ray showing 5 ROIs in each of the head and chest X-ray images. These 5 ROIs represent the 5 densest clusters Harris features. If more than 5 ROIs are desired, the clustering method may be adjusted to automatically identify 10 or 15 clusters of Harris features, for example. FIG. 20 is a head and chest X-ray showing 10 ROIs in each of the head and chest X-ray images based on the 10 densest clusters of Harris features. Similarly, FIG. 21 is a head and chest X-ray showing 15 ROIs in each of the head and chest X-ray images based on the 15 densest clusters of Harris features.

Figure 22:
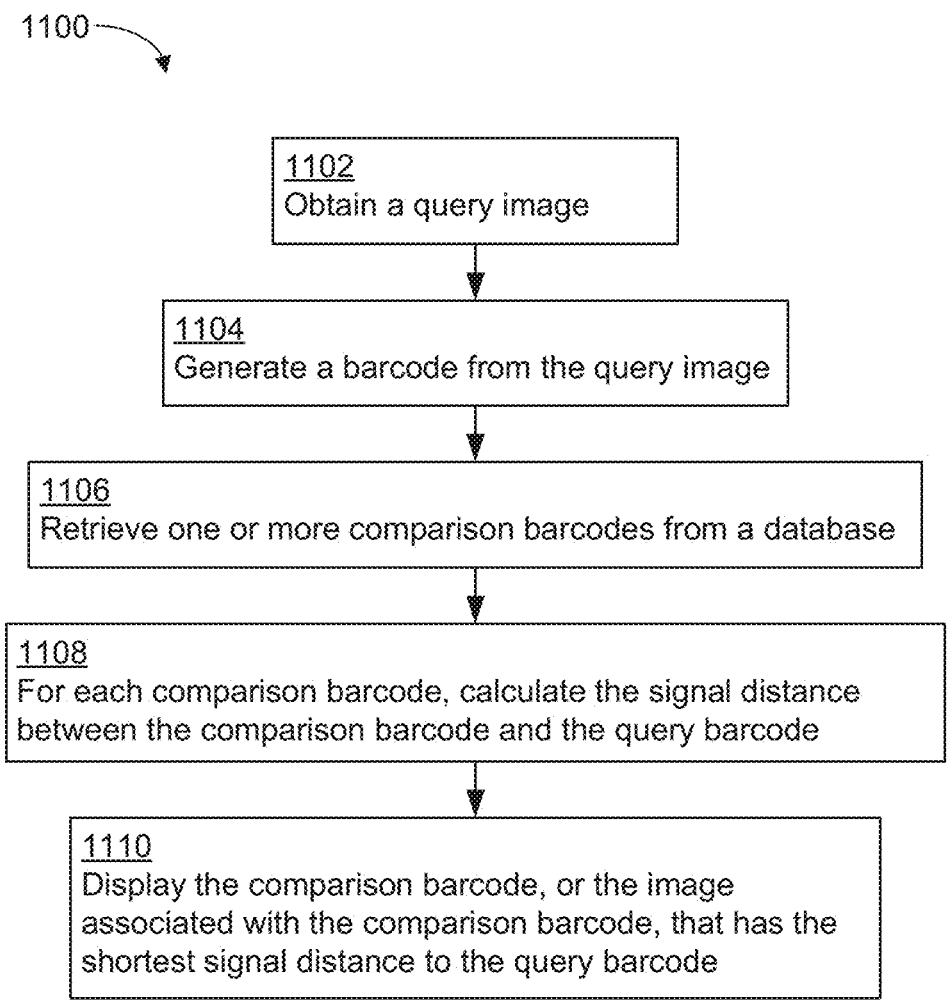
FIG. 22 is a flowchart diagram of a transform barcode-based CBIR method for searching and retrieving images according to an embodiment of the present disclosure.

FIG. 22 is a flowchart diagram of a transform barcode-based CBIR method for searching and retrieving images in real-time or near real-time according to an embodiment of the present disclosure.

The operation 1100 beings with obtaining a query image at 1102. At 1104, the CBIR system generates a barcode from the query image. The barcode generation may proceed according to any of the barcode generation methods described in the present application, such as method 200 or method 400 for example. Further, a ROI or subset of the query image may be used to generate one or more query barcodes.

At 1106, the CBIR system retrieves one or more comparison barcodes from a database. These comparison barcodes represent their respective associated images and were generated according to the same method as the query barcode. The database may store the associated images or may store links/pointers to the associated images. The CBIR system may simply retrieve all barcodes stored in the database for comparison to the query barcode. In a further embodiment, the CBIR system may only retrieve a subset of the barcodes stored in the database for comparison to the query barcode, which may improve the performance of the CBIR system.

At 1108, the CBIR system compares the signal distance of each comparison barcode to query barcode pair based on a bitwise difference calculation. In an embodiment, the signal distance is a Hamming distance, which is the bitwise sum of an exclusive-or (XOR) operation output; therefore, the Hamming distance is a measurement of the number of bitwise differences between the comparison barcode and the query barcode. In another embodiment, the signal distance is a Jaccard index.

In an embodiment, the XOR operation is applied to a first comparison barcode and the query barcode; next, the XOR operation is applied to a second comparison barcode and the query barcode; this process continues until all comparison barcodes have been compared.

The comparison barcode and query barcode pair having the shortest signal distance represents the two most similar barcodes; since the barcodes are generated from and well-represent their respective associated images, the shortest signal distance also points to the database image that most closely resembles the query image.

At 1110, the comparison barcode having the shortest signal distance to the query barcode is selected from the set of previously retrieved barcodes. This barcode or its associated image, or both, are presented to the user on the display. If the image is stored in the database, it may be directly retrieved by the CBIR system for presentation on the display. Otherwise, if the image is stored externally and is accessible, the CBIR system follows the image link stored in the database and retrieves the image from the external source for presentation on the display.

In a further embodiment, a number of most similar images are found and retrieved by the CBIR system 100. After the most similar image determined above, the next most similar images correspond to the barcodes having the next shortest signal distances.

Whether a single most similar image is retrieved or multiple similar images are retrieved, CBIR system may optionally retrieve and present medical case information related to these similar images. The related medical case information is of great relevance to the current patient's case because the user can see how previous patients with similarly imaged illnesses were diagnosed, treated and evaluated.

In an embodiment, the steps 1104 to 1108 are performed in real-time between initially obtaining the query image from the medical imaging device and finally displaying the result the image search and retrieval. Performing steps 1104 to 1108 in real-time means that the CBIR system of the present disclosure can deliver CBIR search and retrieval results to the user within seconds or minutes after the medical imaging scan of the patient. Accordingly, related medical case information may be delivered to the patient's doctor with minimal delay, for a timely diagnosis of the patient's illness.

Figure 23:
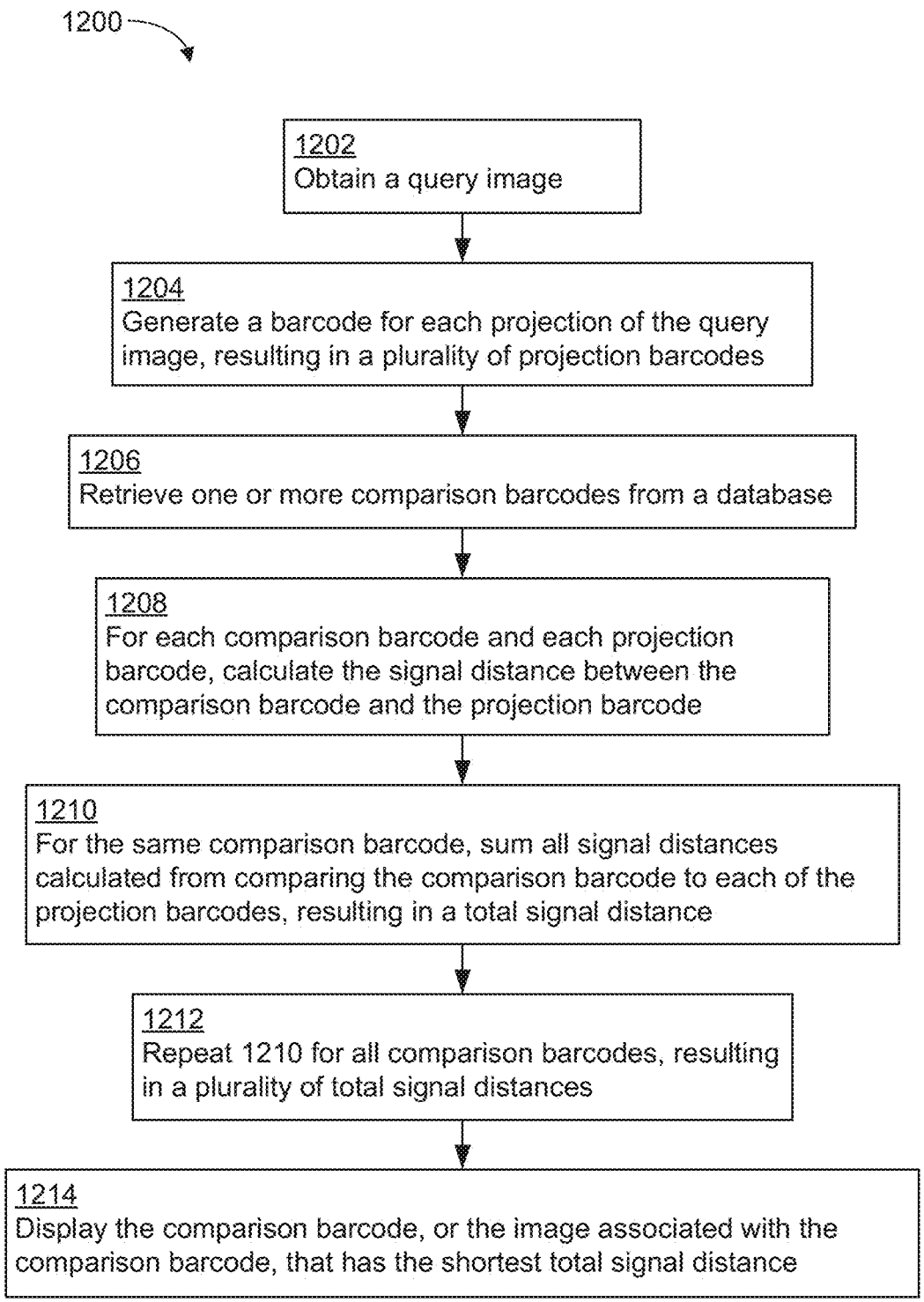
FIG. 23 is a flowchart diagram of a transform barcode-based CBIR method for searching and retrieving images according to a further embodiment of the present disclosure.

FIG. 23 is a flowchart diagram of a transform barcode-based CBIR method for searching and retrieving images according to a further embodiment of the present disclosure.

The method 1200 beings with obtaining a query image at 1202. At 1204, the CBIR system generates a barcode from each projection of the query image. This results in a plurality of projection barcodes. The projection barcode generation is similar to the barcode generation methods described in the present application, such as method 200 or method 400 (or variations of methods 200 and 400), and involves storing the partial barcodes created after thresholding, rather than vectorizing or assembling the partial barcodes into a single barcode for the query image.

At 1206, the CBIR system retrieves one or more comparison barcodes from a database. These comparison barcodes represent their respective associated images. The database may store the associated images or may store links/pointers to the associated images. The CBIR system may simply retrieve all barcodes stored in the database for comparison to the query barcode. In a further embodiment, the CBIR system may only retrieve a subset of the barcodes stored in the database for comparison to the query barcode, which may improve the performance of the CBIR system.

At 1208, the CBIR system calculates the signal distance of each comparison barcode and projection barcode pair. In an embodiment, the signal distance is a Hamming distance. In another embodiment, the signal distance is a Jaccard index.

At 1210, for a same comparison barcode, all of the calculated signal distances between that comparison barcode and each of the projection barcodes are summed into a total signal distance value.

At 1212, the previous step is repeated for all comparison barcodes, resulting in a plurality of total signal distance values.

At 1214, the comparison barcode having the shortest total signal distance value is selected from the set of previously retrieved barcodes. This barcode or its associated image, or both, are presented to the user on the display. If the image is stored in the database, it may be directly retrieved by the CBIR system for presentation on the display. Otherwise, if the image is stored externally and is accessible, the CBIR system follows the image link stored in the database and retrieves the image from the external source for presentation on the display.

In a further embodiment, a number of most similar images are found and retrieved by the CBIR system 100. After the most similar image determined above, the next most similar images correspond to the barcodes having the next shortest signal distances.

Whether a single most similar image is retrieved or multiple similar images are retrieved, CBIR system may optionally retrieve and present medical case information related to these similar images. The related medical case information is of great relevance to the current patient's case because the user can see how previous patients with similarly imaged illnesses were diagnosed, treated and evaluated.

In an embodiment, the steps 1104 to 1108 are performed in real-time between initially obtaining the query image from the medical imaging device and finally displaying the result the image search and retrieval. Performing steps 1104 to 1108 in real-time means that the CBIR system of the present disclosure can deliver CBIR search and retrieval results to the user within seconds or minutes after the medical imaging scan of the patient. Accordingly, related medical case information may be delivered to the patient's doctor with minimal delay, for a timely diagnosis of the patient's illness.

In a further embodiment, the CBIR system uses hashing methods (such as locality-sensitive hashing) to store the barcodes in the database. Hashing functions can position barcodes in a lookup table such that the query barcode may be compared more quickly to the most similar comparison barcode.

In yet a further embodiment, the CBIR system uses classification methods (such as support vector machines) to store barcodes in the database. By classifying the barcodes and their associated images, the barcodes are grouped into subsets such that exhaustive search of all barcodes may be avoided. Searching a subset of barcodes accelerates the real-time performance of the CBIR system.

In yet a further embodiment, the CBIR system inputs the Radon transform of the image (the Radon projections) into a deep learning-based convolutional neural network or autoencoder to further compress the values of the Radon projections before thresholding.

The performance of a Radon barcode CBIR system according to an embodiment the present disclosure was validated against conventional feature detection-based CBIR systems.

In a first test, the Radon barcode system was compared against a SURF system and a BRISK system, which are leading state of the art feature detection-based CBIR systems. A collection of 12,631 X-ray images from the Image Retrieval in Medical Applications (IRMA) database (http://irma-project.org/) was used for comparison images in this test. The IRMA images are classified into 193 categories and annotated with an IRMA code. 1,733 new images were used as query images for this test. The IRMA code of the retrieved image is compared to the code of the query image to determine whether the retrieved image is relevant to the query image.

Table 1 shows the real-time image search and retrieval performance of the Radon barcode system compared to the SURF and BRISK systems for the 1,700 IRMA images. The error rate refers to the difference between the IRMA code of the query image and the retrieved image. A lower error rate indicates a retrieved image that is more similar to a query image.

The failure rate refers to the percentage of cases for which not enough features could be found for the image. The failure rate shows that feature detection-based CBIR methods encounter some images that cannot be processed, whereas the Radon barcode CBIR method of the present disclosure does not encounter failures because the image processing method is not based on feature detection.

The time refers to the amount of time in seconds the CBIR system required to retrieve a comparison image result from the query image search. Lower retrieval time enables the CBIR system to search larger databases for the same amount of waiting time.

It is clear from the error rate, failure rate, and retrieval time that the Radon barcode system clearly outperforms conventional SURF and BRISK systems in this first test.

TABLE 1

| | Error | Failure | Time (s) | $n_{tables}$ | Key size | $n_{hits}$ |
|---|---|---|---|---|---|---|
| SURF | 525.85 | 4.56% | 9 | 30 | $|v|/4$ | 5 |
| | 525.94 | 4.56% | 7 | 40 | $|v|/3$ | 10 |
| | 526.05 | 4.56% | 6 | 30 | $|v|/3$ | 5 |
| | 526.13 | 4.56% | 11 | 40 | $|v|/4$ | 5 |
| | 526.74 | 4.56% | 6 | 40 | $|v|/3$ | 5 |
| | 527.66 | 4.56% | 8 | 20 | $|v|/4$ | 5 |
| BRISK | 761.96 | 1.1% | 6 | 20 | $|v|/3$ | 10 |
| | 761.96 | 1.1% | 5 | 20 | $|v|/4$ | 10 |
| | 761.96 | 1.1% | 8 | 30 | $|v|/3$ | 10 |
| | 761.96 | 1.1% | 7 | 30 | $|v|/4$ | 10 |
| | 761.96 | 1.1% | 11 | 40 | $|v|/3$ | 10 |
| | 761.96 | 1.1% | 9 | 40 | $|v|/4$ | 10 |

TABLE 1-continued

| | Error | Failure | Time (s) | $n_{tables}$ | Key size | $n_{hits}$ |
|---|---|---|---|---|---|---|
| Min-max Radon barcode | 415.75 | 0% | 0.51 | 20 | $|v|/3$ | 10 |
| | 415.75 | 0% | 0.52 | 20 | $|v|/4$ | 10 |
| | 415.75 | 0% | 0.53 | 30 | $|v|/3$ | 10 |
| | 415.75 | 0% | 0.54 | 30 | $|v|/4$ | 10 |
| | 415.75 | 0% | 0.55 | 40 | $|v|/3$ | 10 |
| | 415.75 | 0% | 0.57 | 40 | $|v|/4$ | 10 |

In a second test, the accuracy and speed of the Radon barcode system was compared against image-based, feature-based, and hashing-based systems. The rows of Table 2 show a series of experimental results using 10, 20, 50, 100, 250, and 500 synthetic prostate ultrasound images with 20 segmentations each, which were used to compute a consensus contour. The consensus contours were generated using a CBIR method (imaged-based, barcode-based, feature-based, and hashing-based). The image-based method compares bitwise similarity between raw uncompressed images.

Table 2 shows that the Radon barcode system generates the consensus contour much more quickly than the image-based, feature-based, and hashing-based systems, while achieving nearly-equal or better accuracy.

TABLE 2

| No. of images/no. segmentations per image | Maximum Achievable Accuracy | Method of consensus contour generation | | | | | | |
|---|---|---|---|---|---|---|---|---|
| | | Image-based | | Barcode-based | | Feature-based | | Hashing-based | |
| | | Accuracy | Time | Accuracy | Time | Accuracy | Time | Accuracy | Time |
| 10/20 | 78 ± 6 | 75 ± 7 | 0.453 | 76 ± 6 | <0.001 | 75 ± 5 | 0.033 | — | — |
| 20/20 | 80 ± 6 | 78 ± 7 | 0.879 | 77 ± 7 | <0.001 | 80 ± 7 | 0.021 | 79 ± 7 | 0.056 |
| 50/20 | 84 ± 5 | 76 ± 7 | 2.224 | 77 ± 7 | <0.001 | 79 ± 7 | 0.015 | 77 ± 7 | 0.056 |
| 100/20 | 86 ± 5 | 78 ± 8 | 4.288 | 80 ± 8 | 0.003 | 80 ± 7 | 0.021 | 80 ± 7 | 0.056 |
| 250/20 | 88 ± 5 | 80 ± 8 | 10.902 | 81 ± 7 | 0.003 | 81 ± 8 | 0.045 | 80 ± 7 | 0.057 |
| 500/20 | 89 ± 4 | 81 ± 8 | 21.534 | 81 ± 7 | 0.004 | 81 ± 8 | 0.087 | 81 ± 7 | 0.059 |

In a third test, magnetic resonance images of the prostate of 5, 10, and 15 patients were marked by 5 oncologists. The best marked contour was used a gold standard for comparison to the Radon barcode system. Table 3 shows that as the number of images in the database increases, the accuracy of the Radon barcode system increases yet the search and retrieval time remains small and relatively constant.

TABLE 3

| No. of Patients | No. of Images | Accuracy (Jaccard Index) | Time (ms) |
|---|---|---|---|
| 5 Patients | 50 | 84.4% ± 11% | 1 ± 3 |
| 10 Patients | 94 | 85.7% ± 10% | 1 ± 3 |
| 15 Patients | 145 | 86.7% ± 9% | 1 ± 4 |

The present disclosure provides a transform-based CBIR system and method for generating barcode data structures, which can capture relevant image information using fewer bits of information as compared to conventional feature detection-based CBIR systems. Therefore, the transform-based CBIR system of the present disclosure can achieve greater real-time processing performance as compared to conventional feature detection-based CBIR systems. Experimental validation has shown that a Radon transform-based CBIR system of the present disclosure achieves nearly equal or better image retrieval accuracy yet at an order of magnitude improved retrieval speed, as compared to conventional CBIR methods.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A content-based image retrieval (CBIR) system for identifying a similar image for a query image, the system comprising:
   a database for storing a plurality of comparison barcodes indexed with respective comparison images; and
   a processor configured to:
   obtain the query image;
   select one or more regions of interest (ROI) from a set of regions of interest identified by the user or a set of regions of interest automatically identified by the CBIR system for selection;
   generate one or more query barcodes for the one or more regions of interest to represent the query image, wherein generating the one or more query barcodes comprises:
   applying a transform to at least a portion of the query image to extract a subset of image data and to generate a plurality of image transform values based on the extracted subset of image data;
   thresholding the plurality of image transform values to generate a plurality of compact image transform values, the plurality of compact image transform values corresponding to the plurality of image transform values having a reduced range of values; and
   generating the one or more query barcodes based on the plurality of compact image transform values to represent the query image;
   retrieve, from the database, one or more comparison barcodes from the plurality of comparison barcodes;
   calculate a signal distance between each comparison barcode and query barcode to determine a degree of similarity between that comparison barcode and the one or more query barcodes; and
   identify the similar image for the query image by identifying the comparison image indexed with the comparison barcode that has the shortest signal distance to the one or more query barcodes.

2. The CBIR system of claim 1, wherein the transform is a Radon transform.

3. The CBIR system of claim 2, wherein the processor is further configured to:
   select a number of projections for the Radon transform;
   apply noise reduction to the query image;
   under-sample the image; and
   normalize pixel intensities of the query image.

4. The CBIR system of claim 3, wherein the processor is further configured to threshold the plurality of image transform values via at least one of: local thresholding, global thresholding, incremental thresholding, and min-max thresholding.

5. The CBIR system of claim 1, wherein the database stores the plurality of comparison barcodes and the respective comparison images, and the processor is further configured to retrieve, from the database, the comparison image associated with the comparison barcode that has the shortest signal distance to the query barcode, and to output that comparison image.

6. The CBIR system of claim 1, wherein the database stores the plurality of comparison barcodes and the links to the locations of the externally-stored comparison images, and the processor is further configured to retrieve, from an external source, the comparison image associated with the comparison barcode that has the shortest signal distance to the one or more query barcodes, and to output the comparison image.

7. The CBIR system of claim 1, wherein the signal distance is a Hamming distance.

8. The CBIR system of claim 1, wherein the processor is further configured to compress the plurality of image transform values using an artificial neural network.

9. The CBIR system of claim 1, wherein the processor is configured to generate at least one query barcode to represent the query image by generating one or more arrays of data based on the query image.

10. A content-based image retrieval (CBIR) system for identifying a similar image for a query image, the system comprising:
    a database for storing a plurality of comparison barcodes indexed with respective comparison images; and
    a processor configured to:
    obtain the query image;
    select one or more regions of interest (ROI) from a set of regions of interest identified by the user or a set of regions of interest automatically identified by the CBIR system for selection;
    generate one or more query barcodes for the one or more regions of interest to represent the query image, wherein generating the one or more query barcodes comprises:
    selecting a number of projections for a Radon transform;
    applying the Radon transform to at least a portion of the query image to extract a subset of image features and to generate a plurality of Radon projection functions based on the extracted subset of image features;

thresholding the plurality of Radon projection functions to generate a plurality of compact Radon projection functions, the plurality of compact Radon projection functions corresponding to the plurality of Radon projection functions having a reduced range of values; and generating the set of query barcodes based on the plurality of compact Radon projection functions, each query barcode being generated based on a compact Radon projection function of the plurality of compact Radon projection functions;

retrieve, from the database, one or more comparison barcodes from the plurality of comparison barcodes;

calculate a signal distance between each comparison barcode and each query barcode to determine a similarity between the respective comparison barcode and the respective query barcode;

for each comparison barcode, sum all signal distances calculated from the comparison with the set of query barcodes to generate a total signal distance value; and identify the similar image for the query image by identifying the comparison image indexed with the comparison barcode that has the shortest total signal distance.

11. The CBIR system of claim 10, wherein the processor is further configured to threshold the plurality of Radon protection functions via at least one of: local thresholding, global thresholding, incremental thresholding, and min-max thresholding.

12. The CBIR system of claim 10, wherein the database stores the plurality of comparison barcodes and the respective comparison images, and the processor is further configured to retrieve, from the database, the comparison image associated with the comparison barcode that has the shortest total signal distance to the set of query barcodes, and to output the comparison image.

13. The CBIR system of claim 10, wherein the database stores the plurality of comparison barcodes and the links to the locations of the externally-stored comparison images, and the processor is further configured to retrieve, from an external source, the comparison image associated with the comparison barcode that has the shortest total signal distance to the set of query barcodes, and to output the comparison image.

14. The CBIR system of claim 10, wherein the signal distance is a Hamming distance.

15. The CBIR system of claim 10, wherein the processor is further configured to compress the plurality of Radon projection functions using an artificial neural network.

16. A content-based image retrieval (CBIR) system for identifying at least one similar image for a query image, the system comprising:

a database for storing a plurality of comparison image representations indexed with respective comparison images; and a processor configured to:

obtain the query image;

select one or more regions of interest (ROI) from a set of regions of interest identified by the user or a set of regions of interest automatically identified by the CBIR system for selection;

generate one or more query image representations for the one or more regions of interest to represent the query image, wherein generating the one or more query barcodes comprises:

applying a transform to at least a portion of the query image to extract a subset of image data and to generate a plurality of image transform values based on the extracted subset of image features;

thresholding the plurality of image transform values to generate a plurality of compact image transform values, the plurality of compact image transform values corresponding to the plurality of image transform values having a reduced range of values;

generating the one or more query image representations based on the plurality of compact image transform values to represent the query image;

retrieve, from the database, one or more comparison image representations from the plurality of comparison image representations;

calculate a signal distance between each comparison image representation and the one or more query image representations to determine a degree of similarity between that comparison image representation and the one or more query image representations; and identify the at least one similar image for the query image by identifying the comparison image indexed with the comparison image representation that has the shortest signal distance to the query image representation.

17. The CBIR system of claim 16, wherein the transform is a Radon transform.

18. The CBIR system of claim 17, wherein the processor is further configured to:

select a number of projections for the Radon transform;

apply noise reduction to the query image;

under-sample the query image; and normalize pixel intensities of the query image.

19. The CBIR system of claim 18, wherein the processor is further configured to threshold the plurality of image transform values via at least one of: local thresholding, global thresholding, incremental thresholding, and min-max thresholding.

20. The CBIR system of claim 16, wherein the processor is further configured to threshold the plurality of image transform values using an artificial neural network.

* * * * *

UNITED STATES PATENT AND TRADEMARK OFFICE
CERTIFICATE OF CORRECTION

PATENT NO. : 10,628,736 B2
APPLICATION NO. : 15/274351
DATED : April 21, 2020
INVENTOR(S) : Hamid Reza Tizhoosh It is certified that error appears in the above-identified patent and that said Letters Patent is hereby corrected as shown below:

In the Claims

Claim 1, Column 17, Line 49, "identified by the user" should read --identified by a user--

Claim 10, Column 18, Line 56, "identified by the user" should read --identified by a user--

Claim 16, Column 20, Line 3, "identified by the user" should read --identified by a user--

Claim 16, Column 20, Lines 8-9, "wherein generating the one or more query barcodes comprises" should read --wherein generating the one or more query image representations comprises--

Signed and Sealed this
Twenty-seventh Day of June, 2023

Katherine Kelly Vidal
*Director of the United States Patent and Trademark Office*